USO09183530B2

United States Patent
Schwarz et al.

(10) Patent No.: US 9,183,530 B2
(45) Date of Patent: Nov. 10, 2015

(54) STARTER-INTERRUPT DEVICE INCORPORATING GLOBAL POSITIONING SYSTEM FUNCTIONALITY

(75) Inventors: Stanley G. Schwarz, Littleton, CO (US); Christopher M. Macheca, Centennial, CO (US); Michael Glancy, Highlands Ranch, CO (US); Chris Aron, Denver, CO (US); Mary Sue Karlin, Denver, CO (US); Franco Chirico, Highlands Ranch, CO (US)

(73) Assignee: **Gordon*Howard Associates, Inc.**, Littleton, CO (US)

( * ) Notice: Subject to any disclaimer, the term of this patent is extended or adjusted under 35 U.S.C. 154(b) by 2735 days.

(21) Appl. No.: 11/539,292

(22) Filed: Oct. 6, 2006

(65) Prior Publication Data

US 2007/0185728 A1    Aug. 9, 2007

Related U.S. Application Data

(63) Continuation-in-part of application No. 11/349,523, filed on Feb. 7, 2006.

(51) Int. Cl.
| G06Q 10/00 | (2012.01) |
| G06Q 10/08 | (2012.01) |
| G06Q 10/06 | (2012.01) |
| G06Q 30/02 | (2012.01) |

(52) U.S. Cl.
CPC ............... *G06Q 10/08* (2013.01); *G06Q 10/06* (2013.01); *G06Q 30/0283* (2013.01)

(58) Field of Classification Search
None
See application file for complete search history.

(56) References Cited

U.S. PATENT DOCUMENTS

| 4,335,370 A | 6/1982 | Scalley et al. |
| 4,624,578 A | 11/1986 | Green |
| 4,688,026 A | 8/1987 | Scribner et al. |
| 4,700,296 A | 10/1987 | Palmer, Jr. et al. |
| 5,014,206 A | 5/1991 | Scribner et al. |
| 5,132,968 A | 7/1992 | Cephus |
| 5,490,200 A | 2/1996 | Snyder et al. |
| 5,510,780 A | 4/1996 | Norris et al. |

(Continued)

FOREIGN PATENT DOCUMENTS

| EP | 1557807 | 7/2005 |
| WO | WO 96/16845 | 6/1996 |

(Continued)

OTHER PUBLICATIONS

On Time Payment Protection Systems, printed Jan. 2, 2004 from www.ontime-pps.com/how.html.

(Continued)

*Primary Examiner* — Gerardo Araque, Jr.

(57) ABSTRACT

An onboard starter-interrupt device incorporates Global Positioning System (GPS) functionality in addition to payment schedule enforcement functions. In response to certain events, and/or on a periodic basis, the onboard device transmits vehicle location data to an operations center. In one aspect, a "geo-fence", or virtual boundary, can be defined; if the vehicle is driven outside the geo-fence, the location information is transmitted to the operations center and/or other action is taken. In response to receiving vehicle location data, the operations center can send a message to cause the onboard device to disable the vehicle, or to present a warning to the vehicle owner, or to notify a third party of the event and/or vehicle location, or any combination thereof.

12 Claims, 11 Drawing Sheets

(56) References Cited

U.S. PATENT DOCUMENTS

| | | | |
|---|---|---|---|
| 5,818,725 | A | 10/1998 | McNamara et al. |
| 5,819,869 | A | 10/1998 | Horton |
| 5,898,391 | A | 4/1999 | Jefferies et al. |
| 5,917,405 | A | 6/1999 | Joao |
| 5,969,633 | A | 10/1999 | Rosler |
| 6,025,774 | A | 2/2000 | Forbes |
| 6,026,922 | A | 2/2000 | Horton |
| 6,157,317 | A | 12/2000 | Walker |
| 6,195,648 | B1 | 2/2001 | Simon et al. |
| 6,249,217 | B1 | 6/2001 | Forbes |
| 6,278,936 | B1 | 8/2001 | Jones |
| 6,380,848 | B1 | 4/2002 | Weigl et al. |
| 6,429,773 | B1 | 8/2002 | Schuyler |
| 6,489,897 | B2 | 12/2002 | Simon |
| 6,587,739 | B1 | 7/2003 | Abrams et al. |
| 6,611,201 | B1* | 8/2003 | Bishop et al. ............ 340/426.21 |
| 6,611,686 | B1 | 8/2003 | Smith et al. |
| 6,665,613 | B2 | 12/2003 | Duvall |
| 6,714,859 | B2 | 3/2004 | Jones |
| 6,717,527 | B2 | 4/2004 | Simon |
| 6,741,927 | B2 | 5/2004 | Jones |
| 6,804,606 | B2 | 10/2004 | Jones |
| 6,812,829 | B1 | 11/2004 | Flick |
| 6,816,089 | B2 | 11/2004 | Flick |
| 6,816,090 | B2 | 11/2004 | Teckchandani et al. |
| 6,828,692 | B2 | 12/2004 | Simon |
| 6,870,467 | B2 | 3/2005 | Simon |
| 6,873,824 | B2 | 3/2005 | Flick |
| 6,888,495 | B2 | 5/2005 | Flick |
| 6,917,853 | B2 | 7/2005 | Chirnomas |
| 6,924,750 | B2 | 8/2005 | Flick |
| 6,950,807 | B2 | 9/2005 | Brock |
| 6,952,645 | B1 | 10/2005 | Jones |
| 6,961,001 | B1 | 11/2005 | Chang et al. |
| 6,972,667 | B2 | 12/2005 | Flick |
| 7,005,960 | B2 | 2/2006 | Flick |
| 7,015,830 | B2 | 3/2006 | Flick |
| 7,031,826 | B2 | 4/2006 | Flick |
| 7,031,835 | B2 | 4/2006 | Flick |
| 7,053,823 | B2 | 5/2006 | Cervinka et al. |
| 7,061,137 | B2 | 6/2006 | Flick |
| 7,091,822 | B2 | 8/2006 | Flick et al. |
| 7,123,128 | B2 | 10/2006 | Mullet et al. |
| 7,133,685 | B2* | 11/2006 | Hose et al. ................. 455/456.1 |
| 7,149,623 | B2 | 12/2006 | Flick |
| 7,205,679 | B2 | 4/2007 | Flick |
| 7,224,083 | B2 | 5/2007 | Flick |
| 7,266,507 | B2 | 9/2007 | Simon et al. |
| 7,323,982 | B2 | 1/2008 | Staton et al. |
| 7,327,250 | B2 | 2/2008 | Harvey |
| 7,389,916 | B2 | 6/2008 | Chirnomas |
| 7,561,102 | B2 | 7/2009 | Duvall |
| 2001/0040503 | A1 | 11/2001 | Bishop |
| 2002/0193926 | A1 | 12/2002 | Katagishi et al. |
| 2003/0036823 | A1 | 2/2003 | Mahvi |
| 2004/0088345 | A1 | 5/2004 | Zellner et al. |
| 2004/0176978 | A1 | 9/2004 | Simon et al. |
| 2004/0177034 | A1 | 9/2004 | Simon et al. |
| 2004/0203974 | A1 | 10/2004 | Seibel |
| 2004/0204795 | A1 | 10/2004 | Harvey et al. |
| 2005/0017855 | A1 | 1/2005 | Harvey |
| 2005/0033483 | A1 | 2/2005 | Simon et al. |
| 2005/0134438 | A1 | 6/2005 | Simon |
| 2005/0162016 | A1 | 7/2005 | Simon |
| 2005/0270178 | A1 | 12/2005 | Ioli |
| 2006/0059109 | A1 | 3/2006 | Grimes |
| 2006/0108417 | A1 | 5/2006 | Simon |
| 2006/0111822 | A1 | 5/2006 | Simon |
| 2006/0122748 | A1 | 6/2006 | Nou |
| 2006/0136314 | A1 | 6/2006 | Simon |
| 2007/0010922 | A1 | 1/2007 | Buckley |
| 2008/0114541 | A1 | 5/2008 | Shintani et al. |
| 2008/0162034 | A1 | 7/2008 | Breen |

FOREIGN PATENT DOCUMENTS

| | | | |
|---|---|---|---|
| WO | 2007092272 | A2 | 8/2007 |
| WO | 2007092287 | A2 | 8/2007 |

OTHER PUBLICATIONS

Aircept Products, printed Jan. 2, 2004 from www.aircept.com/products.html.

How PayTeck Works, printed Jan. 2, 2004 from www.payteck.cc/aboutpayteck.html.

Article: "Pager Lets You Locate Your Car, Unlock and Start It", published Dec. 10, 1997 in USA Today.

Article: "Electronic Keys Keep Tabs on Late Payers", published Sep. 22, 1997 in Nonprime Auto News.

Article: "PASSTEC Device Safely Prevents Vehicles from Starting", published Jul. 19, 1999 in Used Car News.

Payment Clock Disabler advertisement, published May 18, 1998.

Secure Your Credit & Secure Your Investment (PayTeck advertisement), printed Jan. 2, 2004 from www.payteck.cc.

iMetrik Company information, printed Dec. 21, 2006 from imetrik.com.

About C-CHIP Technologies, printed Dec. 21, 2006 from www.c-chip.com.

Hi-tech tools to solve traditional problems, printed Dec. 21, 2006 from www.c-chip.com.

C-CHIP Technologies' Products: Credit Chip 100, Credit Chip 100C, Credit Chip 200, printed Dec. 21, 2006 from www.c-chip.com.

The Credit Chip 100, printed Dec. 21, 2006 from www.c-chip.com.

Credit Chip 200G Series and The Credit Chip 200G Series, C-Chip Technologies Corp., date unknown.

C-CHIP Technologies User Guide, C-CHIP Technologies Corp., date unknown.

How PayTeck Works, printed Jan. 2, 2004 from www payteck.cc/aboutpayteck.html.

Gordon* Howard Associates, Inc., International Search Report and the Written Opinion of the International Searching Authority dated Nov. 29, 2007, 6 p.

Gordon * Howard Associates, Inc., International Search Report and the Written Opinion of the International Searching Authority dated Dec. 4, 2007, 6 p.

Schwarz et al., Office Action dated Aug. 21, 2009; U.S. Appl. No. 11/349,523, filed Feb. 7, 2006, p. 18 p.

Schwarz et al., Response to Office Action dated Aug. 21, 2009, filed Jan. 21, 2010; U.S. Appl. No. 11/349,523, filed Feb. 7, 2006, 36 p.

Schwarz et al., Final Office Action dated May 4, 2010; U.S. Appl. No. 11/349,523, filed Feb. 7, 2006, 19 p.

Schwarz et al., RCE and Response to Final Office Action dated May 4, 2010, filed Jul. 12, 2010; U.S. Appl. No. 11/349,523, filed Feb. 7, 2006, 40 p.

Schwarz et al., Office Action dated Oct. 26, 2010; U.S. Appl. No. 11/349,523, filed Feb. 7, 2006, 16 p.

Schwarz et al., Response to Office Action dated Oct. 26, 2010, filed Feb. 21, 2011; U.S. Appl. No. 11/349,523, filed Feb. 7, 2006, 27 p.

Schwarz et al., "Final Office Action dated Apr. 28, 2011," U.S. Appl. No. 11/349,523, filed Feb. 7, 2006.

Schwarz et al., "Appeal Brief filed Jun. 9, 2011," U.S. Appl. No. 11/349,523 filed Feb. 7, 2006.

Schwarz et al., "Office Action dated Dec. 10, 2010," U.S. Appl. No. 12/826,513, filed Jun. 29, 2011.

Schwarz et al., "Response to Office Action dated Dec. 10, 2010, filed Mar. 8, 2011," U.S. Appl. No. 12/826,513, filed Jun. 29, 2011.

Schwarz et al., "Final Office Action dated May 26, 2011," U.S. Appl. No. 12/826,513, filed Jun. 29, 2011.

Schwarz et al., "Restriction Requirement dated Sep. 18, 2009," U.S. Appl. No. 11/684,186, filed Mar. 9, 2007.

Schwarz et al., "Response to Restriction Requirement dated Sep. 18, 2009, filed Dec. 4, 2009," U.S. Appl. No. 11/684,186, filed Mar. 9, 2007.

Schwarz et al., "Office Action dated Apr. 2, 2010," U.S. Appl. No. 11/684,186, filed Mar. 9, 2007.

(56) References Cited

OTHER PUBLICATIONS

Schwarz et al., "Response to Office Action dated Apr. 2, 2010, filed Jun. 25, 2010," U.S. Appl. No. 11/684,186, filed Mar. 9, 2007.
Schwarz et al., "Final Office Action dated Aug. 31, 2010," U.S. Appl. No. 11/684,186, filed Mar. 9, 2007.
Schwarz et al., "RCE in Response to Final Office Action dated Aug. 31, 2010, filed Nov. 9, 2010," U.S. Appl. No. 11/684,186, filed Mar. 9, 2007.
Schwarz et al., "Office Action dated Feb. 17, 2011," U.S. Appl. No. 11/684,186, filed Mar. 9, 2007.
Schwarz et al., "Response to Office Action dated Feb. 17, 2011 filed Apr. 29, 2011," U.S. Appl. No. 11/684,186, filed Mar. 9, 2007.
Morgan et al., "Office Action dated Mar. 10, 2011," U.S. Appl. No. 12/333,904, filed Dec. 12, 2008.
Morgan et al., "Response to Office Action dated Mar. 10, 2011 filed Jun. 7, 2011," U.S. Appl. No. 12/333,904, filed Dec. 12, 2008.

* cited by examiner

PASSTIME

| Add New Customer | Terminated | Search | Reports | Admin | Logout | Help |

Search Customers (by last name): ABCDEFGHIJKLMNOPQRSTUVWXYZ | View All

PassTime™ GSM/GPS Pilot
Add New Customer
<< Previous Page
Fields with an * are required

*First Name:
*Last Name:
Phone Number:
Address:
City:
State:
Zip:
Notes:
} 301

Make:
Model:
Year:
Color:
} 302

300

*Start Date: 9/29/2006
Number of Payments:
Price:
Payment:
*Payment Schedule: Monthly
*Account Number:
Grace Days: 0
} 303

VIN: — 304
Email: — 305
Inventory Stock #:
First Payment: 9/29/2006
First Payment Amount:
Check Number:
Payment Notes:
} 306
} 307

PTA ☐ Use PTA?
Division:

Select Product Type

Modem ID: (IMSI)
ICCID: (Last 5 digits)
○ Regular Mode
○ Warning/Shut-Off Mode
○ GPS Mode
⊙ Combination (Warning/Shut-Off and GPS)
} 308

[ Add Customer ] — 309

© 2006 PassTime – Phone: 888.547.9017 (toll free)
Email: info@passtimeusa.com

*FIG. 3*

```
Main Menu
PassTime GSM/GPS Demo
Customer Detail for Tom Right to Cure                              402
         NEXT Code | Reset Code | Final Code
GPS Info
                   Send Warning | Send Starter Disable
401        $GPRMC,214914.00,A,3936.7519,N,10501.1274,W,000.0,000.0,010206,10.5,E,A*1D
                   OK
            IP Address: 66.209.15.235
            Sequence #: 57
                   Lat: 39.6125316666        403        404
                  Long: -105.01879
          Speed (knots): 000.0
                Course: 000.0
                        View Map | View Map (Hybrid)
Customer Info
      Days left on Unit: -623
         Serial Number: 1000048
         Warning Starts:
                   Name: Tom Right to Cure
           Phone Number: (813) 555-1111
                Address: 123 Oak St.
                   City: Orangeburg
                  State: SC                               405        400
                    Zip: 29118
      Terminated Account: No
                  Notes: Great guy to work with
                    PTA: No
              RTC State: SC Make: Ford
                  Model: Taurus         406
                   Year: 1999
                  Color: Blue
       Payment Schedule: Monthly
         Account Number: 123456         407
             Grace Days: 2                        406
                    VIN: Y65FGG999900012
                  Email: Tom@test.com
                Version: Power Pay           408
       Inventory Stock #: R6754
Payment History - (Click on Payment Date to edit)
 Date       Amount  Notes  Code          Type      Days  Good Until  Receipt
 4/15/2004  $325.00 View   451 854 956   Payment   20    5/15/2004   Print
 3/15/2004  $258.00 View   858 754 954   Payment   22    4/14/2004   Print
 2/12/2004  $300.00 View   651 254 658   Payment   20    3/10/2004   Print
 1/15/2004  $0.00   View   045 875 254 014 Set Date                  Print
```

FIG. 4    410            409                              411

Add New Customer | Terminated | Search | Reports | Admin | Logout | Help
Search Customers (by last name): A B C D E F G H I J K L M N O P Q R S T U V W X Y Z | Blank | Misc.

Demo – 9999
Next Code for Carrie Abel   _503_
<< Previous Page

Product: PassTime Plus   _501_
Regular Days: ___ OR Until Date: ___ Show Calendar   _502_
Warning Days: ___ OR Until Date: ___ Show Calendar   _503A_
Emergency Days: 2   _504_
Payment Amount: ___   _505_
Check Number: ___   _506_

Payment Notes:
[                                    ]   _507_

[ Generate Code ]

(Please click only once or else you'll add a duplicate record)
© 2003–2005 PassTime – Phone: 888.547.9017 (toll free) Email: info@passtimeusa.com

STARTER-INTERRUPT DEVICE INCORPORATING GLOBAL POSITIONING SYSTEM FUNCTIONALITY

CROSS-REFERENCE TO RELATED APPLICATION

This invention is a continuation-in-part of U.S. patent application Ser. No. 11/349,523 for "ENFORCING PAYMENT SCHEDULES", filed Feb. 7, 2006, the disclosure of which is incorporated herein by reference.

FIELD OF THE INVENTION

The present invention relates to the use of Global Positioning System (GPS) functionality in the context of a payment enforcement system that disables, alerts, and locates a vehicle in response to a missed payment or other event.

DESCRIPTION OF THE RELATED ART

Lenders have various mechanisms for enforcing payment of debt obligations, particularly those obligations that arise from the sale of goods or property on credit. For example, mortgagees can foreclose on real property if a mortgagor defaults. Vehicle finance companies can repossess a vehicle in the event the owner fails to make timely payment.

In some cases, foreclosure payment schedule enforcement mechanisms are expensive and/or cumbersome to implement. Accordingly, lenders often refuse to extend credit when the likelihood of default exceeds some amount, because of the expense or impracticality of repossessing or otherwise enforcing payment obligations. In particular, potential buyers with poor credit history may be denied credit when attempting to purchase a vehicle or other item because of the relatively high likelihood of default. In addition, payments on less expensive items such as appliances, computers, and the like are often difficult to enforce because repossession is far too expensive in relation to the value of the item itself, and because the item loses much of its value once it is used.

Payment enforcement systems exist whereby a vehicle (or other purchased property) is equipped with a device capable of disabling the vehicle in the event of non-payment. Whenever the purchaser/owner makes a timely payment, he or she is given a password to enter on a keypad installed in the vehicle. Entry of the password enables the vehicle for some limited period of time (usually until the next payment due date, plus some grace period). Failure to enter the password causes the vehicle to be disabled, for example by interrupting the starter circuitry. Usually, the owner is given some warning of impending disablement, and may also be provided with a limited number of emergency starts whereby the vehicle can be used a few times even if a code has not been entered. In some variations, the password is transmitted wirelessly to the vehicle so that the owner need not enter it manually.

Such systems, available for example from PassTime USA of Littleton, Colo., are effective in reducing the incidence of delinquency and default. However, a significant level of default remains, which the lender is forced to engage in costly repossession activities.

In addition, lenders often want to know where the vehicle is, particularly in cases of default. Such information would be useful in reducing the cost of repossession. Furthermore, providing such information to lenders can reduce the likelihood of default, particularly if the owner of the vehicle is informed of the fact that location information is being made available to lenders.

It may also be useful to provide lenders (and/or others) with location information in response to certain trigger events, such as detecting that a vehicle is being taken out of state or out of country.

What is needed, therefore, is a device that is able to disable a vehicle in response to certain events such as non-payment, and also provides location tracking information to lenders (and/or others) in response to certain events. What is further needed is a device that performs such functions without unduly impinging on customer privacy. What is further needed is a device that performs such functions without imposing undue burden or effort on the vehicle owner.

SUMMARY OF THE INVENTION

The present invention combines remote vehicle disablement with location tracking information, so as to provide a payment assurance solution that reduces the risk of default and also reduces the cost of repossession in the event of default. The present invention performs such functions in a manner that respects the privacy of the vehicle owner, and that imposes little or no burden on the owner.

According to the techniques of the present invention, an improved onboard starter-interrupt device incorporates Global Positioning System (GPS) functionality in addition to payment schedule enforcement functions. In response to certain events, and/or on a periodic basis, the onboard device transmits vehicle location data to an operations center. These events can include, for example, a request from the operations center, detection of unauthorized use, dismantling, or tampering of the vehicle or the onboard device, driving the vehicle outside permissible boundaries, and the like. In one aspect, a "geo-fence", or virtual boundary, can be defined; if the vehicle is driven outside the geo-fence, the location information is transmitted to the operations center and/or other action is taken.

In response to receiving vehicle location data, the operations center can send a message to cause the onboard device to disable the vehicle, or to present a warning to the vehicle owner, or to notify a third party of the event and/or vehicle location, or any combination thereof. Alternatively, the operations center can alert an operator as to the event and/or location of the vehicle, and await further instructions from the operator.

In one aspect, detection of certain location information at the vehicle can cause the onboard device to immediately disable the vehicle before instructions are received from the operations center. The device can then await further instructions from the operations center. In this manner, a "fail-safe" provision can be implemented that disables the vehicle in the event certain location information is detected and no communication can be established with the operations center.

In one aspect, a payment schedule can be configured. If the vehicle owner fails to make payment by a certain date, the operations center can send a message to the onboard device to output alerts, disable the vehicle, provide location information, or any combination thereof in any desired sequence.

By combining vehicle disablement technology with location detection, the present invention provides an improved system and method for enforcing payment schedules and reducing the likelihood and cost of default.

BRIEF DESCRIPTION OF THE DRAWINGS

FIG. 3 depicts an example of a user interface screen for setting up customer information and payment schedule according to one embodiment.

FIG. 4 depicts an example of a user interface screen for viewing GPS information, customer information, and payment history, according to one embodiment.

FIG. 5 depicts an example of a user interface screen for specifying warning periods, shutdown periods, payment information, and the like, according to one embodiment.

DETAILED DESCRIPTION OF THE EMBODIMENTS

Figure 1:
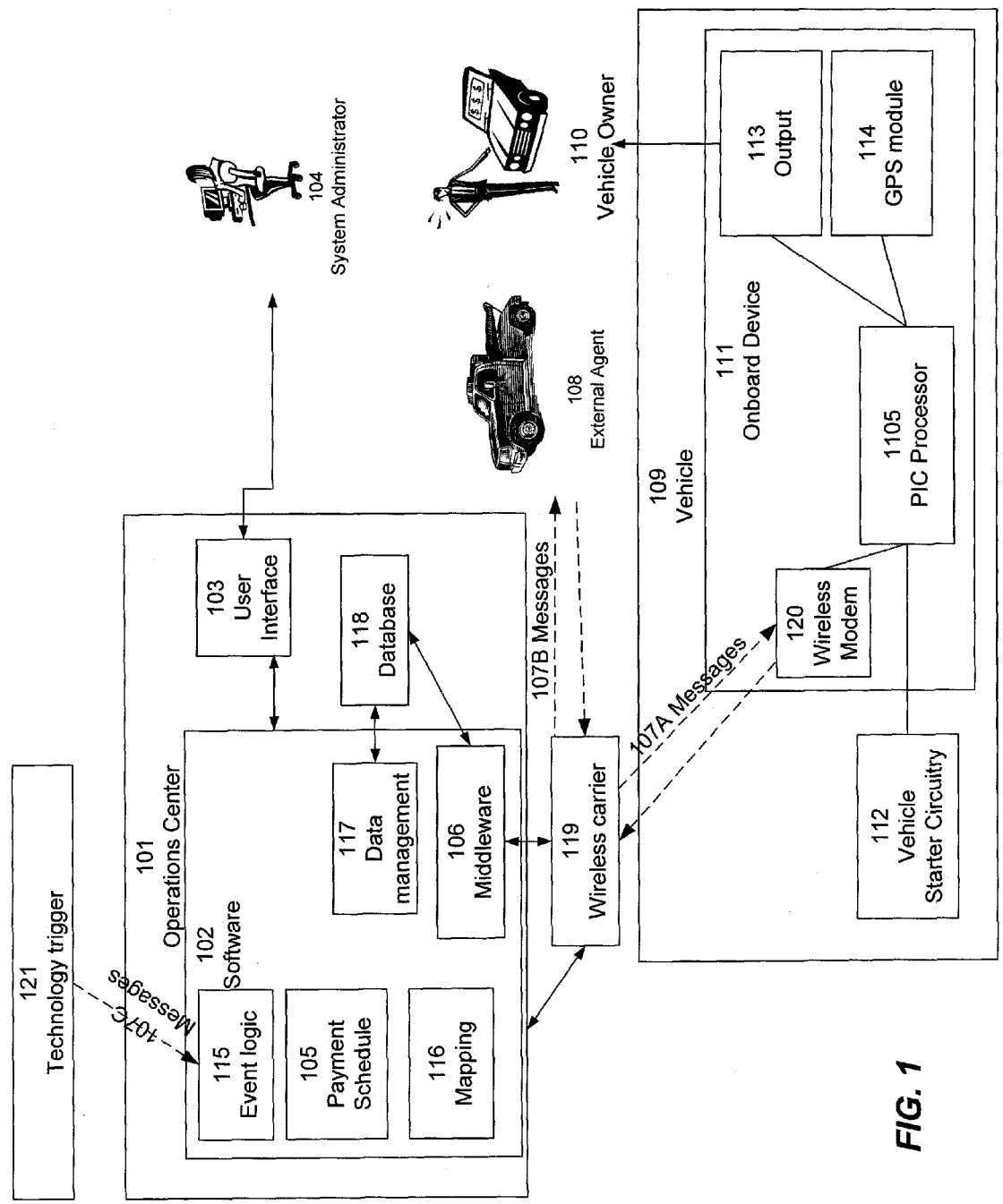
FIG. 1 depicts an overall architecture for an embodiment of the invention.

Enforcement of payment schedules in a centralized, flexible manner is described in related co-pending U.S. patent application Ser. No. 11/349,523 for "ENFORCING PAYMENT SCHEDULES", filed Feb. 7, 2006, the disclosure of which is incorporated herein by reference. As described therein, various types of events can be configured via software running at an operations center. Upon occurrence of a specified event, a message is sent to a remotely located device, such as one installed in a vehicle or other product. The onboard device is configured so that it can disable the vehicle (for example by disabling the starter circuitry) upon receipt of the message from the operations center. In implementations involving products other than vehicles, other mechanisms for disabling the product (such as cutting off power to the product) can be used. The remotely located device can be instructed to allow a certain number of emergency uses, or to accept an override password that re-enables use of the vehicle.

In one embodiment, location tracking functionality is implemented in connection with the onboard device. The location tracking functionality is implemented, for example, using known global positioning system (GPS) technology. The onboard device can be programmed to periodically transmit location information to a central operations center, and/or to transmit such information in response to particular events, and/or to automatically output warnings/alerts to the vehicle operator in response to particular events, and/or to automatically disable the vehicle in response to particular events. Software at the operations center allows a system administrator to configure the system and to specify which events cause which actions to be taken. In addition, certain events (such as nonpayment) can be detected at the operations center, causing a message to be sent to the onboard device and result in disabling or affecting the operation of the vehicle, warnings, location reporting, or any combination thereof.

For illustrative purposes, the description provided herein sets forth the invention in the context of vehicles and vehicle location tracking. However, one skilled in the art will recognize that the invention can be used in connection with any product, particularly products that are capable of being moved from one location to another. For example, locations of consumer electronic devices, wide-screen televisions, appliances, and the like can be reported according to the techniques set forth herein.

According to one embodiment, the present invention is implemented as a software application running at an operations center. The software application receives location information from a GPS tracking mechanism, detects relevant events such as nonpayment and geo-fence violations, and generates messages in response to the events. These messages are received by remotely located devices installed in vehicles or other products. Upon receiving a message, the remotely located device takes appropriate action, disabling the vehicle, transmitting its current location, outputting alerts, or the like.

Referring now to FIG. 1, there is shown a block diagram depicting an overall architecture for an embodiment of the invention. Software 102 running at operations center 101 performs much of the functionality of the present invention. In one embodiment, operations center 101 is situated at some central location and is operated by or on behalf of a lender, seller, or loan service company. Appropriate communications infrastructure, such as Internet, wireless, and/or telecommunications connectivity is provided, so as to allow operations center 101 to communicate with other elements of the overall system.

Onboard device 111 is located in vehicle 109 and includes a processor, such as PIC processor 1105, which implements the onboard functionality of the present invention. PIC processor 1105 interfaces with wireless modem 120 for sending and receiving messages, output device 113 for presenting output to owner 110, and GPS module 114 for determining vehicle location. Software running on PIC processor 1105 controls enablement and disablement of vehicle starter circuitry 112. In one embodiment, PIC processor 1105 is communicatively coupled to vehicle starter circuitry 112 to facilitate such disablement when needed. In other embodiments, PIC processor 1105 is coupled to other vehicle circuitry such as a Controller Area Network (CAN) bus, on-board diagnostic (OBD) port, or the like, so that it can affect operation of vehicle 109 by disabling, curtailing, or limiting certain features and functions of vehicle 109 as appropriate. For example, under certain conditions, vehicle speed and/or vehicle functionality may be limited in response to a nonpayment event.

System administrator 104 interacts with software 102 via user interface 103, which allows system administrator 104 to specify options, schedules, alert conditions, and the like, and also allows system administrator 104 to view reports, monitor system operations, and the like. System administrator 104 may be located at or near operations center 101, or may be remotely located, in which case interactions with software 102 may take place over a computer network such as the Internet, virtual private network, or the like, according to techniques that are well known to those of skill in the art.

Technology trigger 121 provides messages 107C specifying events that have occurred. Technology trigger 121 can be any source of information that is relevant to the payment schedule enforcement mechanism of the present invention.

For example, technology trigger 121 may be a data stream providing information from a payment system, so that upon receipt of messages 107C from technology trigger 121, software causes payment schedule 105 and/or other information to be updated.

Event logic 115 specifies what actions should be taken in response to such messages 107C. For example, technology trigger 121 can inform software 102 that a payment has been received, or that a payment has been missed, or that some other event has taken place. Event logic 115 tells software 102 what to do in response to such events.

Payment schedule 105 for a particular debtor is stored, for example, in a database or other data store at operations center 101 or at some other location. Software 102 enforces payment schedule 105 by sending appropriate messages according to event logic 115, on-demand needs, or local override. Software 102 uses mapping information 116 to detect geo-fence violations and to otherwise interpret vehicle location information received from onboard device 111. Software 102 is communicatively coupled with accounting systems (not shown) or other sources of data that inform software 102 when a payment is late or when other relevant events take place that require messages 107A, 107B to be sent.

In one embodiment, software 102 also includes data management module 117, which maintains customer information, financial controls, verification data to ensure authenticity of messages 107A from vehicles 109, and the like. Such information can be stored in database 118, which in one embodiment is implemented as a SQL server database. Data management module 117 can also maintain payment schedules 105, and can specify changes to event logic 115, under the control of user interface 103.

In one embodiment, software 102 invokes middleware 106 to send messages 107A, via wireless carrier 119, to modem 120 associated with device 111 at vehicle 109. In one embodiment, middleware 106 can also be used for sending messages 107B to external agent 108, although in other embodiments messages 107B are sent directly by software 102. For example, middleware 106 can communicate with a cellular network via Internet Protocol; messages are then sent via the cellular network using a GSM or other protocol to modem 120 in vehicle 109. External agent 108 can receive information regarding vehicle 109 by other means, for example by receiving email messages from operations center 101, or by logging onto a web site run by operations center 101.

In one embodiment, messages are sent using an Access Point Name (APN) associated with a wireless carrier 119 communicating via a GPRS protocol. Any other network or protocol can be used, including for example GSM, CMDA, or the like. The APN enables sending and/or receiving messages to external agent 108 and/or wireless modem 120 on onboard device 111. Middleware 106 provides an interface by which software 102 can communicate with many different types of devices, systems, computers, vehicles, nodes, and the like, via a variety of protocols, to provide mobile device control and data acquisition functionality. Essentially, middleware 106 acts a protocol translation module between software 102 and whatever entities software 102 communicates with. For example, for certain devices 111, Internet Protocol (IP) may be an appropriate communication medium, whereas cell or pager messages may be the appropriate mechanism for other devices 111. Examples of other communication protocols that can be used include GPRS, SMS Edge, Java, SQL and the like. In one embodiment, the present invention is implemented using mobile device middleware available from Intellimatics of Coppell, Tex. Standard ODBC protocols can be used to communicate with Intellimatics databases (via standard SQL commands, a SQL Server database, and UDP, SMS, and/or TCP/IP messaging protocols).

Event management middleware 106 sends messages 107A to remotely located device 111 installed in vehicle 109. In one embodiment, modem 120 in device 111 receives such messages 107A. Messages 107A instruct device 111 to perform various operations, such as disabling vehicle starter circuitry 112 in order to prevent operation of vehicle 109, outputting alerts or other information to owner 110 via output mechanism 113, reporting location information, or the like. Output mechanism 113 may be a speaker for issuing beeps and spoken information, or it may be a display screen for showing visual alerts, SMS alerts, email messages, text alerts, or some combination thereof. In one embodiment, output mechanism 113 is a standalone output device that is connected to or part of device 111; in another embodiment, output mechanism 113 can be implemented as part of an existing component of vehicle 109 such as a GPS navigation system, onboard trip computer, or other component. In this manner, the techniques of the present invention can be implemented in a manner that is well integrated with existing input and output mechanisms already present in vehicle 109.

In addition to sending messages 107A and/or 107B, in one embodiment, middleware 106 can also receive messages. For example, middleware 106 may receive acknowledgement messages from device 111 and/or agent 108 to confirm receipt of messages 107A and/or 107B. Middleware 106 also receives vehicle location data from GPS module 114 located at vehicle 109. GPS module 114 can be any device or circuitry for detecting vehicle location, and may be implemented as a component of onboard device 111 or as a separate component capable of communicating with operations center 101. GPS module 114 can use existing GPS functionality in vehicle 109 (such as may be found in the navigation system of vehicle 109), or it can use separate GPS functionality. In an alternative embodiment, middleware 106 can be omitted, and software 102 communicates directly with device 111 via wireless carrier 119 to exchange such information.

In one embodiment, middleware 106 receives data from GPS module 114 which is part of onboard device 111. In another embodiment, operations center 101 receives such data from GPS module 114 or device 111 directly, without using middleware 106.

Although the present invention is described in connection with an embodiment using middleware 106, one skilled in the art will recognize that other embodiments are possible. In particular, middleware 106 can be omitted, so that software 102 communicates directly with onboard device 111 and/or external agent 108, as appropriate.

In one embodiment, GPS module 114 provides location information periodically (such as every minute, or every hour). Onboard device 111 records such information locally, and transmits the information to operations center 101 in response to some trigger event.

For example, onboard device 111 can be configured to report vehicle location data to operations center 101 in response to any of the following:

periodically (for example, once every hour or once every day);

upon detecting that vehicle 109 is being driven outside defined bounds (referred to herein as a "geo-fence");

upon detecting that vehicle 109 is being driven across state lines or across an international border;

upon detecting that vehicle 109 and/or onboard device 111 and/or GPS module 114 is being modified, tampered with, dismantled, circumvented, disabled, or the like, or that any attempt has been made to do so;

upon receiving a message from operations center 101 instructing onboard device 111 to report vehicle location.

When onboard device 111 reports vehicle location data to operations center 101, it can report current location. Also, if appropriate, it can report a series of locations that have been visited since the last report. In one embodiment, the information describing the series of locations is stored locally at device 111 until it is transmitted to operations center 101, at which time it may be purged from device 111 or archived.

One skilled in the art will recognize that many other trigger events can be specified. In connection with any of the above (or other) trigger events, onboard device 111 can cause vehicle 109 to be disabled, and/or a warning or alert can be output via output device 113 to vehicle owner 110, and/or a message can be sent to operations center 101 and/or to external agent 108.

In various situations, other information may also transmitted to operations center 101, either via middleware 106 or directly. For example, it may be useful to provide mileage information, such as to enforce mileage limits on rented or leased vehicles, or to determine whether preventative maintenance schedules are being followed.

Figure 2:
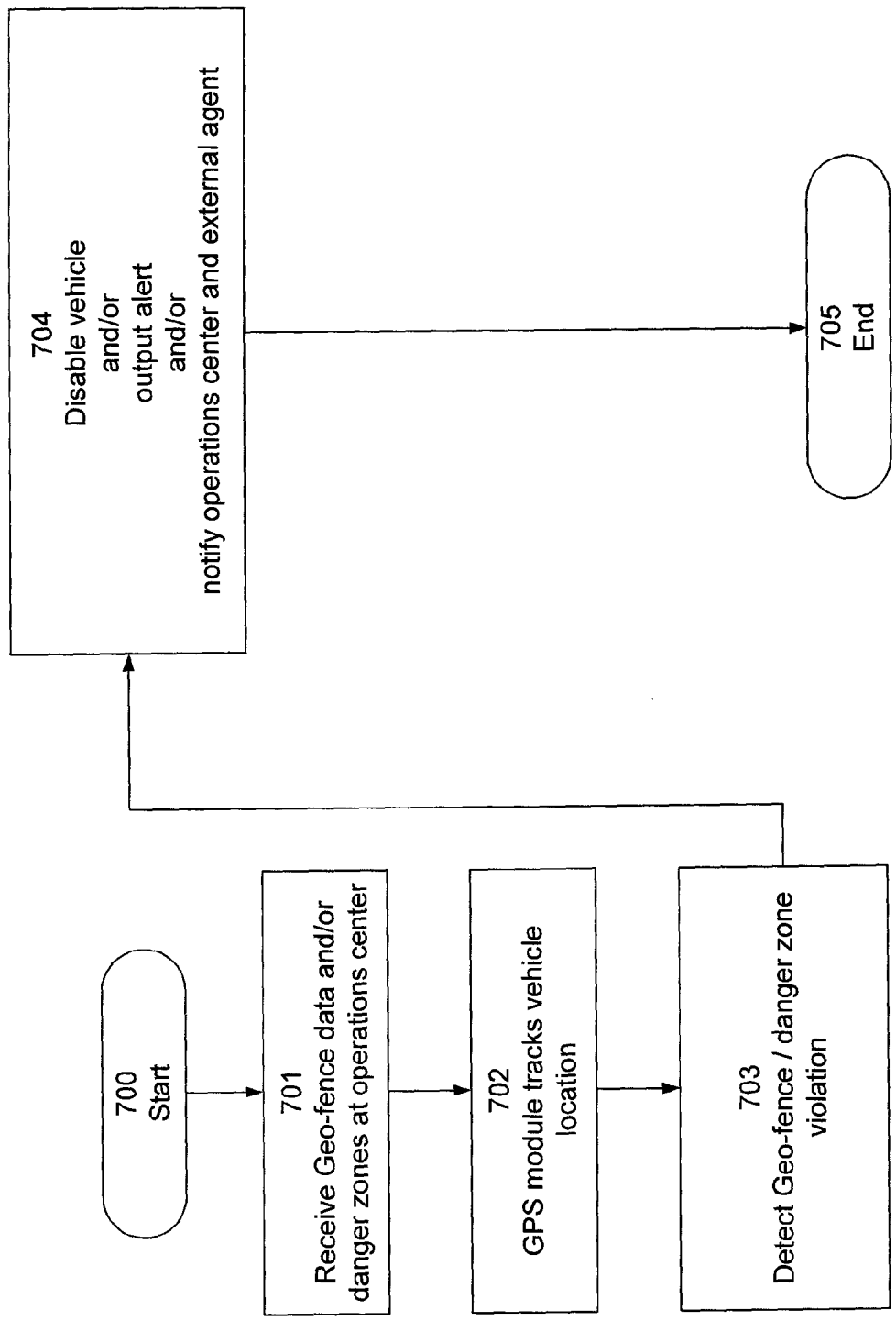
FIG. 2 is a flow diagram depicting an example of a method of practicing the present invention, where a geo-fence violation causes a vehicle to be disabled.

Referring now to FIG. 2, there is shown a flowchart depicting an example of a method of practicing the present invention, where a geo-fence violation causes vehicle 109 to be disabled.

A geo-fence is specified 701, indicating where the vehicle 109 may be driven. For example, the terms of the purchase/lease agreement may impose territorial limitations on where the vehicle can be taken (within a state, within a country, within a certain radius of a defined point, or the like). In one embodiment, system administrator 104 specifies geo-fence using graphical tools provided by user interface 103. For example, system administrator 104 can draw a perimeter on an on-screen map; mapping module 116 interprets the drawn perimeter to define the parameters of the geo-fence.

In addition, certain "danger areas" can be specified as being off-limits (for example scrap yards, impound lots, car auction sites, or other locations associated with unauthorized activity in connection with used vehicles. Specifying such danger areas provides a mechanism by which operations center 101 can be kept proactively informed as to the whereabouts of vehicle 109, in particular when there is a possibility that the vehicle may be sold or otherwise disposed of in an unauthorized fashion.

Administrator 104 can provide geo-fence and/or danger area information via UI 103, and such information is stored at operations center 101 for use by event logic 115. As vehicle 109 is being driven, GPS module 114 continually monitors 702 vehicle 109 location. As mentioned above, GPS module 114 can be part of the vehicle's 109 navigation system, or a separate component. On-board device 111 receives location information from GPS module 114 and periodically sends such information to operations center 101.

A violation is detected 703 based on information provided by GPS module 114. In one embodiment, operations center 101 provides onboard device 111 with geo-fence information, so that device 111 can immediately detect 702 a geo-fence violation upon receipt of certain location information from GPS module 114. Device 111 then informs operations center 101 of the violation. Operations center 101 sends a message 107A to device 111 telling it what to do, such as for example: disable the vehicle 704; output a warning to owner 110; output a warning and then (after some period of time) disable the vehicle 704; or the like. Operations center 101 can also send a message 107B to external agent 108 such as a repossession agent; message 107B can include location information to facilitate repossession of vehicle 109. In one embodiment, device 111 can be programmed to immediately disable vehicle 109 upon detecting 703 a geo-fence violation and to await further instructions from operations center 101. In such a manner, a "fail-safe" mechanism is implemented that allows for the possibility that no communication with operations center 101 can be established. Furthermore, in the event of lost communication, operations center 101 can immediately alert an external agent 108 to dispatch a repossession agent or other individual to the last known location of vehicle 109.

In another embodiment, geo-fence violations are detected 703 at operations center 101 rather than at vehicle 109. Geo-fence information is maintained at operations center 101. Device 111 informs operations center 101 of the location of vehicle 109. Operations center 101 detects 703 geo-fence violations by comparing current location with geo-fence information. When a violation is detected, operations center 101 sends a message 107A to device 111 telling it what to do, such as for example: disable the vehicle 704; output a warning to owner 110; output a warning and then (after some period of time) disable the vehicle 704; or the like. As described above, operations center 101 can also send a message 107B to external agent 108 such as a repossession agent; message 107B can include location information to facilitate repossession of vehicle 109.

By notifying operations center 101 when vehicle 109 re-enters the defined geographic region, the present invention provides a mechanism by which a repossession agent can be notified that the sought-after customer is now back in its home state. In some cases, this might reduce the repossession rate charged by the repossession agent.

Figure 8:
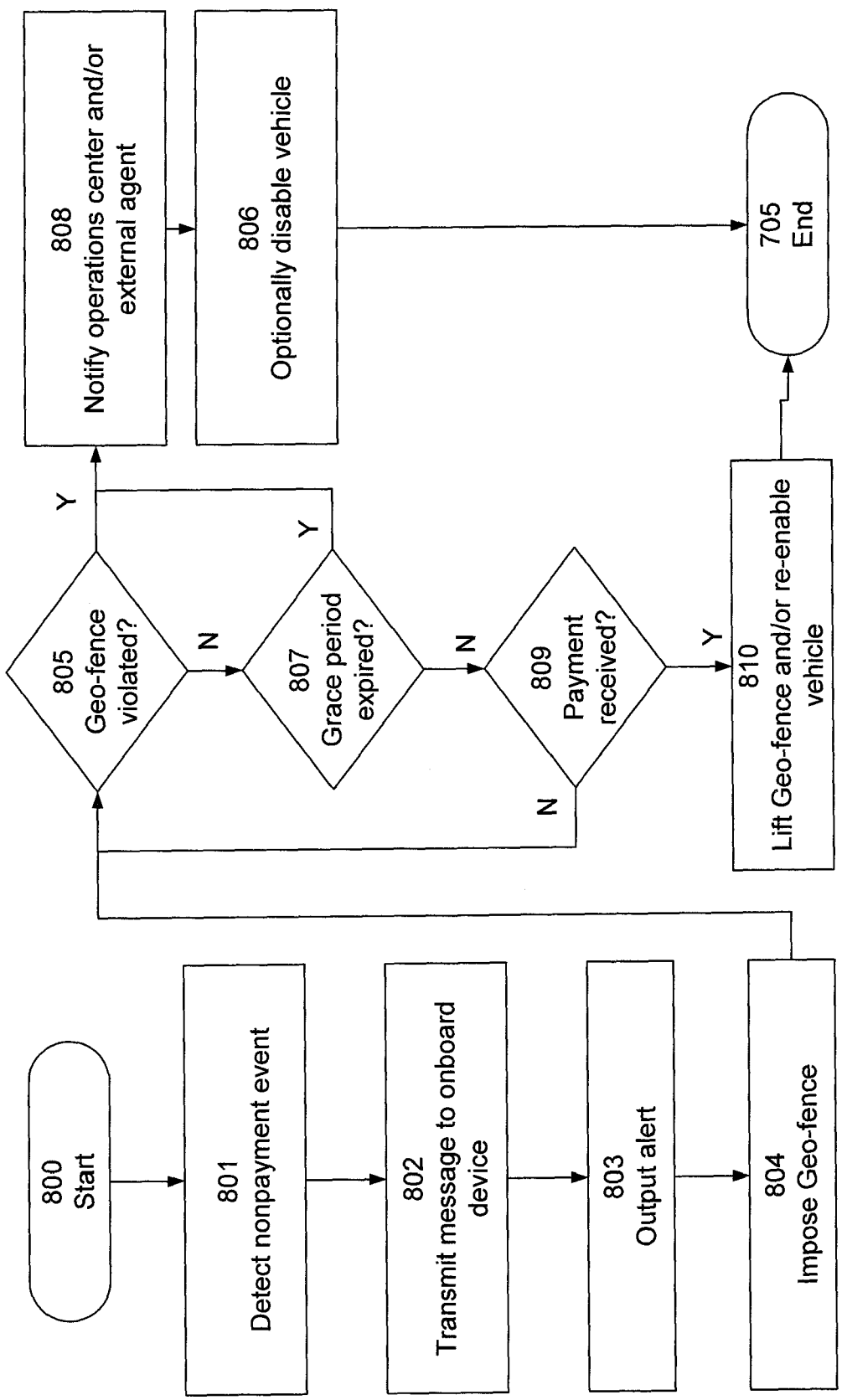
FIG. 8 is a flow diagram depicting an example of a method of practicing the present invention, where a geo-fence is imposed in response to a non-payment event.

The above-described example depicts an embodiment where a geo-fence is imposed at all times. Alternatively, a geo-fence can be imposed in response to a nonpayment event. Referring now to FIG. 8, there is shown a flowchart depicting an example of such a method. Technology trigger 121 detects 801 a nonpayment event. This event can be detected 801, for example, by consulting a payment schedule 105 previously received and stored at operations center 101. The operations by which software 102 receives payment schedule 105 may take place under the control of system administrator 104 via user interface 103. In addition, administrator 104 can specify, via user interface 103, the characteristics of payment schedule 105 and the various actions that should be taken in response to various conditions.

Technology trigger 121 informs software 102 at operations center 101 that a nonpayment event has occurred. Event logic 115 specifies that in response to a nonpayment event, a geo-fence should be imposed and an alert (warning) should be presented to vehicle owner 110. Accordingly, software 102 transmits 802 a message 107A to onboard device 111 containing terms of the geo-fence and grace period (if applicable), and indicating that an alert should be presented. The geo-fence terms can contain a perimeter beyond which the vehicle 109 is not allowed to travel. This perimeter can be defined by latitude/longitude coordinates, or by distance from a known location, or by any other means.

Output mechanism 113 at vehicle 109 outputs 803 the alert, informing vehicle owner 110 that a nonpayment event or other contract violation has occurred. The alert can also inform owner 110 of the grace period for payment, if applicable. Device 111 can be configured/instructed to provide additional alerts via output mechanism 113 as the expiration of the grace period approaches.

Device 111 imposes the geo-fence 804. GPS module 114 informs device 111 of current vehicle locations at regular intervals (for example once a minute). If, according to location information provided by GPS module 114, device 111 detects 805 a violation of the geo-fence, a message 107A is sent 808 to notify operations center 101 of the geo-fence violation. Optionally, vehicle can be disabled (or its operation can be affected or curtailed) upon detection of a geo-fence violation, although in one embodiment such action takes place upon receiving a disable command from operations center 101. System administrator 104 can be automatically notified by email, pager, SMS/text message, or the like. If appropriate, a message 107B can be sent (either by operations center 101, or directly from device 111, or from system administrator 104) to external agent 108. External agent 108 can be, for example, a repossession agent that will dispatch a tow truck to claim the vehicle. Message 107B to external agent 108 contains location information for vehicle 109 so that vehicle 109 can be easily found. In certain situations, other entities can be notified, such as a credit card company, lender, and/or a roadside assistance provider.

If the grace period expires 807 without payment being received, similar action can be taken: operations center 101 is notified 808, vehicle 109 may (optionally) be disabled 806 or its operation may be affected or curtailed, and (optionally) external agent 108 is provided with location information to claim the vehicle.

If payment is received 809, the geo-fence and/or the vehicle disable command are lifted 810. A message can be provided, via output mechanism 113, to inform owner 110 that the geo-fence and/or the vehicle disable command have been lifted.

Even when the strict geo-fence imposed in step 804 is not in effect, in some embodiments location information is still periodically transmitted to operations center 101. Certain events, such as traveling outside the country or across state lines, tampering with the system, and/or the like, can cause a similar sequence of steps to be taken as depicted in FIG. 8.

For example, owner 110 can be alerted to a violation of purchase/lease terms and can be given a warning to immediately return to the permitted geographical region. Failure to return can cause vehicle disablement and can cause a message (including location information) to be sent to external agent 108 to repossess the vehicle.

As indicated above, the system of the present invention can be used with products other than vehicles as well, in which case device 111 might be located in or attached to whatever product is subject to being remotely disabled according to the methods provided herein. In such embodiments, device 111 is configured and situated so that it is capable of disabling the subject product when it receives a message instructing it to do so. For example, device 111 can be configured to be able to shut off a power source (such as 110-volt AC) to an appliance or other product.

In one embodiment, device 111 receives communications from middleware 106 via the same physical medium as is used to power the product (such as AC power lines). Such an arrangement prevents owner 110 (or some other individual) from disabling communications with middleware 106 without also cutting off power to the product. Such an embodiment may be effective for payment enforcement on appliances that run on AC power.

Device 111 can include additional components to enhance functionality. In one embodiment, device 111 includes a WiFi repeater to enable communication with vehicle 109 or other products. The repeater is capable of enabling and/or disabling certain actions within the vehicle such as fuel, ignition, or other components. Device 111 can communicate with middleware 106 using any wireless or wired communication channel, including for example Internet, cellular, radio, GSM, pager, or the like. In one embodiment, device 111 periodically polls middleware 106 for messages; alternatively, device 111 is passive and only responds when middleware 106 sends messages. In one embodiment, device 111 has an IP address so that it can be directly addressed via the Internet protocol.

Messages 107A and 107B may be encoded using any known encoding scheme or protocol. In one embodiment, messages 107A and 107B are password-protected and/or encrypted to reduce the possibility of interception and/or tampering.

Hardware Architecture

Figure 11:
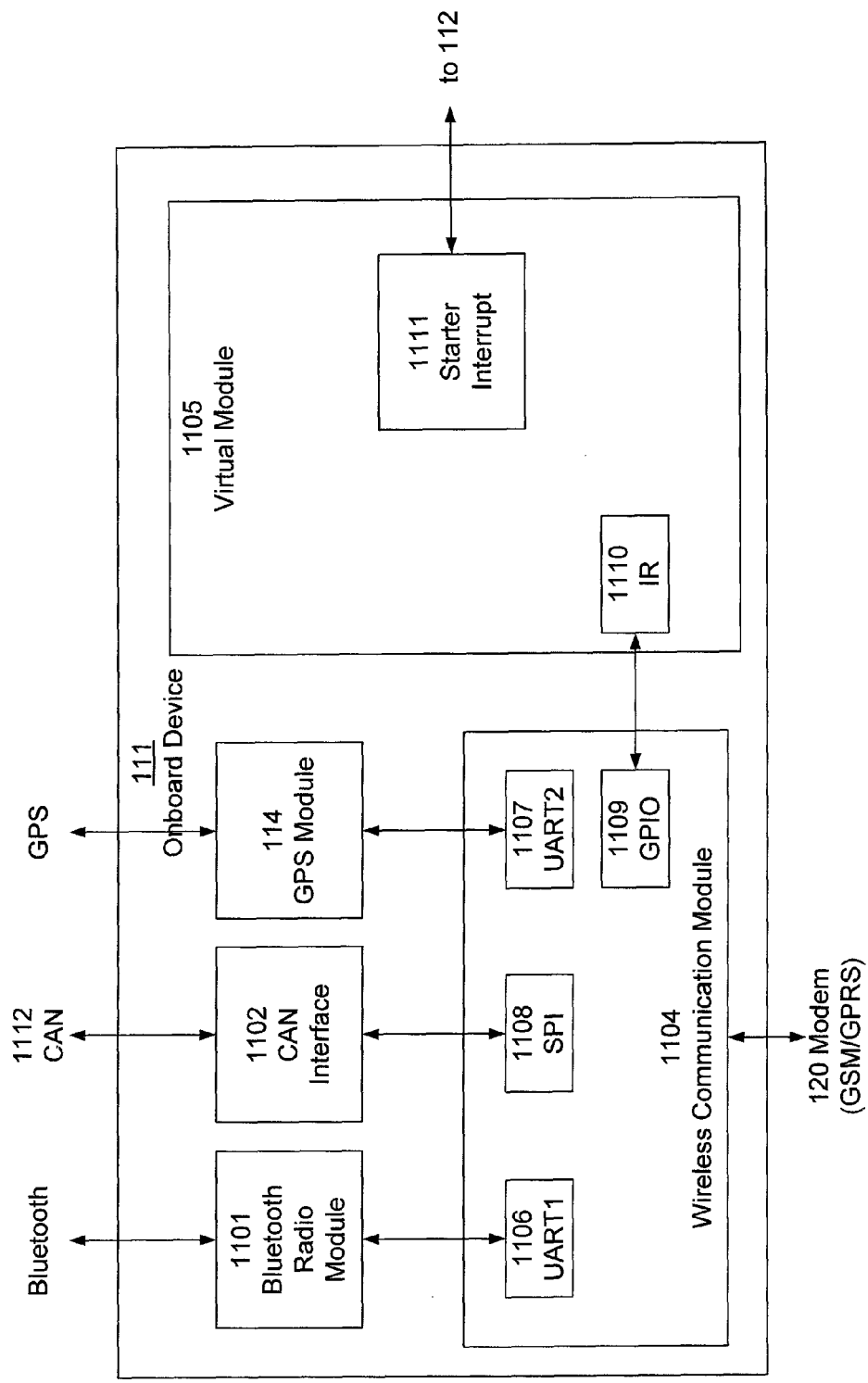
FIG. 11 depicts a hardware architecture for an onboard device according to one embodiment.

Referring now to FIG. 11, there is shown an example of a hardware architecture for onboard device 111 according to one embodiment.

Wireless communication module 1104 enables communication with operations center 101 by known mechanisms such as GPRS. In one embodiment, wireless communication module 1104 is a Wavecom Q26 processing module including a processor and functioning as a quad band GSM/GPRS package. It contains two universal asynchronous receiver transmitters (UARTs), labeled UART1 1106 and UART2 1107, for communication with other components. It also contains a Serial Peripheral Interface Bus (SPI) 1108 for communication with CAN interface and a General Purpose Input/Output (GPIO) 1109 for communication with virtual module 1105. Module 1104 is connected to modem 120 for enabling wireless communication with operations center 101.

In one embodiment, modem 120 implements quad-band GSM/GPRS/CDMA or other protocol(s) according to known techniques. In one embodiment, device 111 includes an SMA connector for GSM antenna. A provisioning interface uses an established web service for provisioning and administration of SIM cards embedded in modem 120.

Virtual module 1105 contains circuitry for performing functionality described herein. In one embodiment, virtual module 1105 is implemented as a PICmicro microcontroller available from Microchip Technology of Chandler, Ariz. In one embodiment, infrared port 1110 is a serial port that communicates with GPIO 1109 of module 1104. Starter interrupt 1111 connects with vehicle starter circuitry 112 to selectively disable vehicle 109 when appropriate.

In one embodiment, device 111 includes a Bluetooth radio module 1101 for communication with a mobile phone, PDA, and/or vehicle electronic components. In one embodiment, module 1101 is controlled via a serial connection into the UART1 1106 of module 1104. Bluetooth radio module 1101 includes chip sets, peripheral components and interconnections and board I/O ports. Other wireless protocols can be used, such as Zigbee or the like.

Controller Area Network (CAN) interface 1102 provides capability for communicating with a CAN 1112 on vehicle 109. Physical connections can be provided, for example, via an OBD2 plug or other physical vehicle electronic interface. In one embodiment, interface 1102 communicates with module 1108 via SPI 1108 of module 1108. Interface 1102 allows module 1108 to control various operations of vehicle 109 and to determine status of various vehicle 109 components.

GPS module 114 is shown as being part of device 111, although it can be external to device 111 if desired (as shown in FIG. 1). GPS module 114 provides the vehicle location determination functionality of the present invention. In one embodiment, GPS module 114 communicates with module 1104 via UART2 port 1107. In one embodiment, GPS module 114 includes an SMB connector for GPS.

In one embodiment, device 111 includes a serial port that can be used for programming and reprogramming of device 111. This port may be shared with the Bluetooth port and is configurable through software.

In one embodiment, device 111 also includes any or all of the following:
- an OBD2 driver plug;
- static RAM (for example, 4 kilobytes);
- nonvolatile parameters memory (for example, 8 kilobytes);
- flash memory (for example, 56 kilobytes).

In one embodiment, device 111 is able to detect a low-power situation, for example when vehicle battery voltage drops below a threshold amount such as six volts. An alert can be output.

In one embodiment, device 111 is able to detect ignition status, so that it can inform operations center 101 of ignition on and/or off events.

In one embodiment, parameters and operations of device 111 can be reprogrammed wirelessly from operations center 101.

In one embodiment, wireless modem 120 on device 111 supports an AT command set. The unit provides the current RSSI (signal strength) and/or decibel (dB) reading at the request of the remote user. For standard AT commands, an OpenAT standard for controlling modems is used; the unit responds with the standard AT command response. For non-standard AT commands, the unit responds with a custom response according to a defined command specification. In one embodiment, modem 120 is capable of being reprogrammed, activated, reactivated, and provisioned wirelessly.

In one embodiment, GPS module 114 is able to provide an immediate read of the longitude/latitude location of the unit at the request of the remote user or other component, and to immediately generate a response (either a GPS location or an error message). Device 111 stores the last known location with a timestamp. This can be requested with a non-standard AT command.

Geo-fence boundaries can be maintained at operations center 101 or at device 111. If maintained at device 111, an enable command is sent to device 111 to enable geo-fencing. Then, operations center 101 can specify and alter the geo-fence event notifications, including for example out-of-boundary events, inboundary events, or both. Geo-fence boundaries can be specified, for example, by either a specified radius from a specified point, or as a polygon defined by 3, 4 or 5 points. Such parameters can be define via user interface 103.

In one embodiment, the N most recent geo-fence events for each active geo-fence are stored in non-volatile memory at device 111. In one embodiment, N is 10.

In one embodiment, periodic GPS location reporting (unsolicited messages to operations center 101) can be enabled/disabled by system administrator 104 via operations center 101. A desired time interval can be specified.

When device 111 receives a command for virtual module 105, it encodes the data to mimic an IR input format readable by module 105, and passes the command to module 1105 via IR interface 1110.

In one embodiment, device 111 is able to log geo-fence events, periodic GPS locations, ignition sensor events, and the like over some defined period of time. Activation/reactivation and provisioning can be performed wirelessly.

When establishing communications with operations center 101, device 111 registers on activation and continually attempts to register until successful. If communication is lost, device 111 continually attempts to re-establish the connection. Periodic "hello" packets are sent to operations center 101 at programmable time intervals.

In one embodiment, device 111 maintains a list of servers to be used by modem 120 in validating received messages 107A, so as to ensure that the messages 107A are coming from an authorized source. This list can be maintained in nonvolatile memory at device 111, and can be updated wirelessly as appropriate. In one embodiment, the list includes Access Point Names (APNs) for servers. Device 111 authenticates messages by verifying port and server address against data stored in the table.

In one embodiment, device 111 decodes UDP-formatted commands from operations center 101 and executes them as appropriate. Device 111 encodes UDP-formatted commands to be sent to operations center 101.

In one embodiment, device 111 can also reply to the operations center's 101 request for the ID, acquired IP address, ICID, IMSI, CNUM, and/or IMEI of the SIM card associated with modem 120.

When requested, device 111 is able to reset modem 120 by performing a soft boot to clear cache and renegotiate network settings.

Software Architecture

Figure 9:
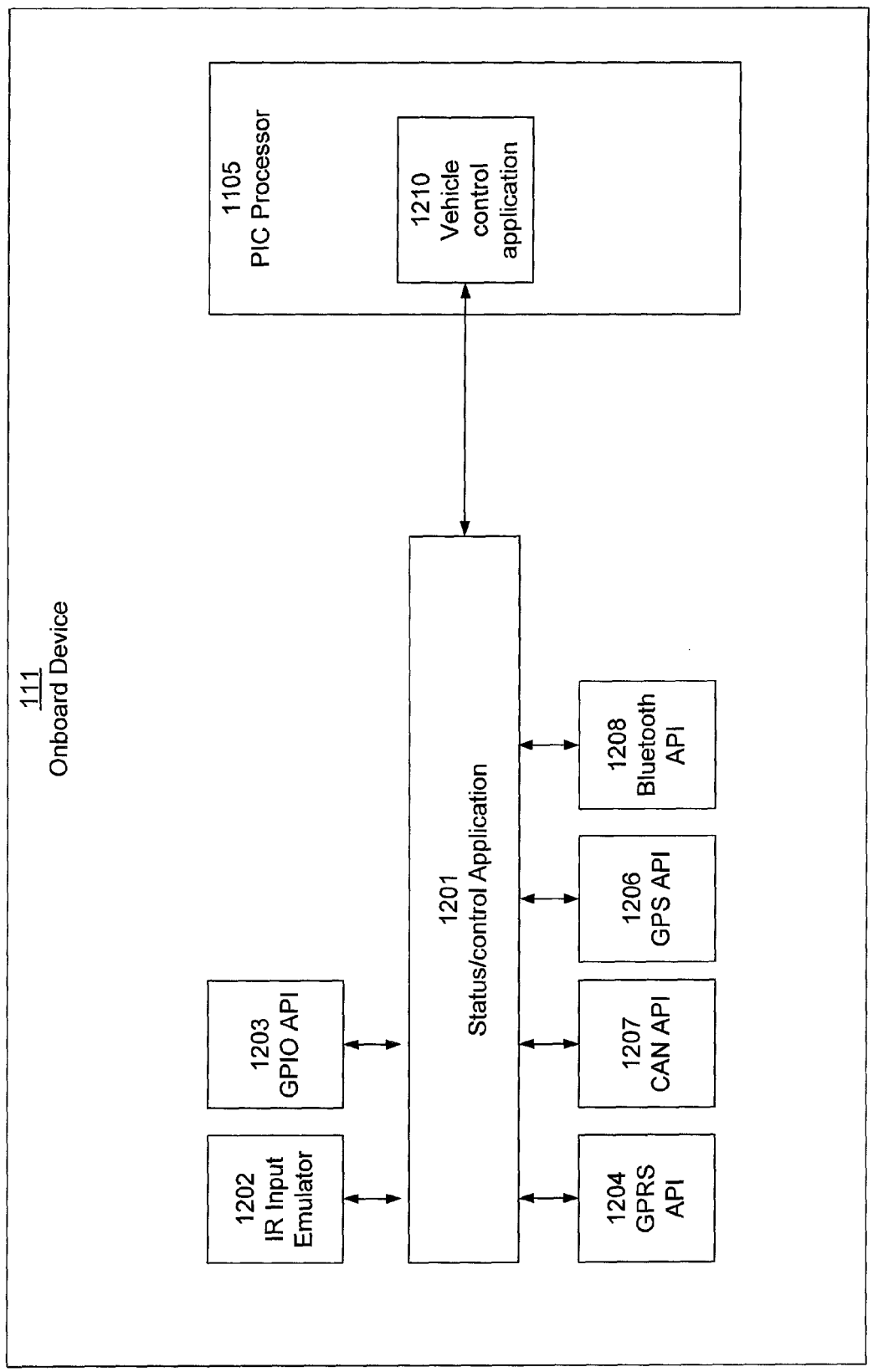
FIG. 9 depicts a software architecture for an onboard device according to one embodiment.

Referring now to FIG. 9, there is shown an example of a software architecture for onboard device 111 according to one embodiment.

In one embodiment, vehicle control application 1210 runs on PIC processor 1105 to implement the functionality of the present invention. Status/control application 1201, which interfaces with other components, may be a separate functional software component (as shown) or can be integrated with vehicle control application 1210. In one embodiment, application 1201 receives instructions from operations center 102, acknowledges receipt, and passes control instructions to application 1210. Application 1210 interfaces with various components of vehicle 109 to disable or affect operation of vehicle 109.

Status/control application 1201 controls wireless communications, GPS and GPRS functions, Bluetooth and other local communications, and CAN interface by making calls to the various APIs 1204, 1206, 1207, and 1208. In one embodiment, status/control application 1201 is an event-driven software module running under the Wavecom OpenAT real-time operating system.

GPRS API 1204 receives GPRS messages and interrupts status/control application 1201 for further processing. GPRS API 1204 also provides modem control and data transmission services for status/control application 1201.

GPS API 1206 is used to control GPS module 114.

CAN API 1207 is used to receive and transmit serial data to CAN 1112, using SPI 1108 to communicate via CAN interface 1102.

Bluetooth API 1208 is used to receive and transmit data via Bluetooth radio module 1101.

IR input emulator 1202 translate messages received by device 111 into an infrared (IR) message format suitable for transmission to application 1210.

General Purpose Input/Output (GPIO) API 1203 provides services for using and controlling multipurpose programmable I/O pins on device 111.

In one embodiment, applications 1201 and 1210 operate according to instructions received from operations center 101, which transmits commands and other information to device 111 via wireless communication techniques as described above.

Software Operation

User interface 103 provides a mechanism by which system administrators 104 can issue commands, track vehicles, review payment history, and the like. UI 103 interacts with software 102, which retrieves relevant data from database 118 and interacts with middleware 106 to send commands to device 111. In one embodiment, commands to be sent via wireless carrier 119 are inserted in database 118. Middleware 106 scans database 118 for new updates. Once an update is found, the new data is encapsulated in a UDP packet and sent via carrier 119. The message is sent via GPRS to vehicle 109 and/or to external agent 108 as appropriate.

Modems in vehicles 109 can be configured for automatic position reporting. For example, they can be configured to send GPS position, vector and satellite information at one-minute intervals. Operations center 101 receives this information and stores it in database 118. Operations center 101 parses the information into the appropriate GPS tables in database 118 (position, vector, and satellite). Mapping module 116 is used to interpret the GPS data. Information is also stored in database 118 for GPS history (such as scheduled interval reporting, or breadcrumbs), Geo-fencing and reverse geo-coding.

The following table 1 summarizes commands that can be handled by device 111 according to one embodiment:

TABLE 1

| Command | Description |
|---|---|
| LOCATE a vehicle | Provide the current LATITUDE/LONGITUDE location of vehicle 109. |
| LOCATE option: Scheduled Interval Reporting | Show an electronic breadcrumb trail of locations (a trail of dots on a map) from a starting point for vehicle 109. |
| LOCATE option: Geo-fencing | Enable the specification of a geographic boundary. Record all entries and exits of vehicle 109 across geo-fence boundaries. Optionally send alerts when these events occur. |
| LOCATE option: Geo-coding | Provide coded map location information (e.g. street, city, state, ZIP) for vehicle 109. Uses reverse geo-coding based on determined latitude/longitude. |
| TRACK a vehicle | Enable periodic transmissions from device 111 at specified intervals. |
| DISABLE the starter on a vehicle | Disable vehicle starter circuitry 112. |
| ENABLE the starter on a vehicle | Enable vehicle starter circuitry 112. |
| Issue a WARNING to a vehicle | Cause an auditory alert (e.g. buzzer) to sound when vehicle 109 is next started. Additional information and/or alert types (such as visual alerts) can be specified as well). |
| Detect POWER on a vehicle | Determine whether vehicle 109 power supply input current is in sleep, standby, or transmit mode. |
| LOW POWER message | When device 111 detects low power on vehicle 109, a warning message is output for owner 110 and/or system administrator 104. |
| Determine SIGNAL STRENGTH for a vehicle | Provide the current RSSI (signal strength) reading. |
| ACKNOWLEDGEMENT | Acknowledge commands sent to device 111; also (optionally) record to a history file and notify by email. |
| USAGE REPORTING on hits. (Hit management) | Examples of usage reporting include: 1) Historical usage 2) Current usage 3) Proactive alerts/emails, including options for using the excess hits. |
| Mapping capabilities | The system will provide visual mapping tools to locate vehicle icons on a map, including satellite imagery and pictometry. |
| Provision GPS/GSM units. | Write the SIM MSISDN (10-digit phone number of SIM) to non-volatile memory and register the SIM on a specified cellular network. |
| SMS communication (2-way) | Initiate communication with the unit via SMS protocol. |
| Detect Ignition on a vehicle. | When system administrator 104 selects ignition, check ignition detection input for ignition ON threshold. This allows administrator 104 to detect when owner 110 stops or starts vehicle 109. |
| KILL unit on vehicle | Permanently disable wireless capabilities of device 111. |

User Interface

In one embodiment, user interface 103 is web-based, with all user interaction occurring through a website. The following description and accompanying FIGS. 3-7 and 9-10 depict various examples of user interface screens for software 102. In one embodiment, these screens are presented as part of user interface 103 for use by system administrator 104 in configuring and operating the system of the present invention. Of course, one skilled in the art will recognize that these screens are merely exemplary and that other layouts, components, and arrangements can be used.

FIG. 3 depicts an example of a user interface screen 300 for setting up customer information and payment schedule according to one embodiment. Screen 300 can be used when a new vehicle owner 110 is being added to the system, for example in response to a new vehicle purchase.

Personal information about owner 110 can be entered in fields 301. Information about the vehicle can be entered in fields 302, 304, and 305. Payment scheduling information can be entered in fields 303, including start date, number of payments, purchase price, payment amount, payment schedule, account number, and grace days. In one embodiment, the payment scheduling information entered in fields 303 is used to update payment schedule 105 and is then used by software 102 in generating events, as described above. Payment information for received payments can be entered in fields 307. Fields 308 allow system administrator 104 to specify identifying information for modem 120 in device 111, and to indicate a mode of operation: a regular mode, a warning/shut-off mode, a GPS mode, or a combination warning/shut-off and GPS mode. System administrator 104 clicks on button 309 to submit the entered information for entry in the appropriate databases, including for example payment schedule 105.

Figure 6:
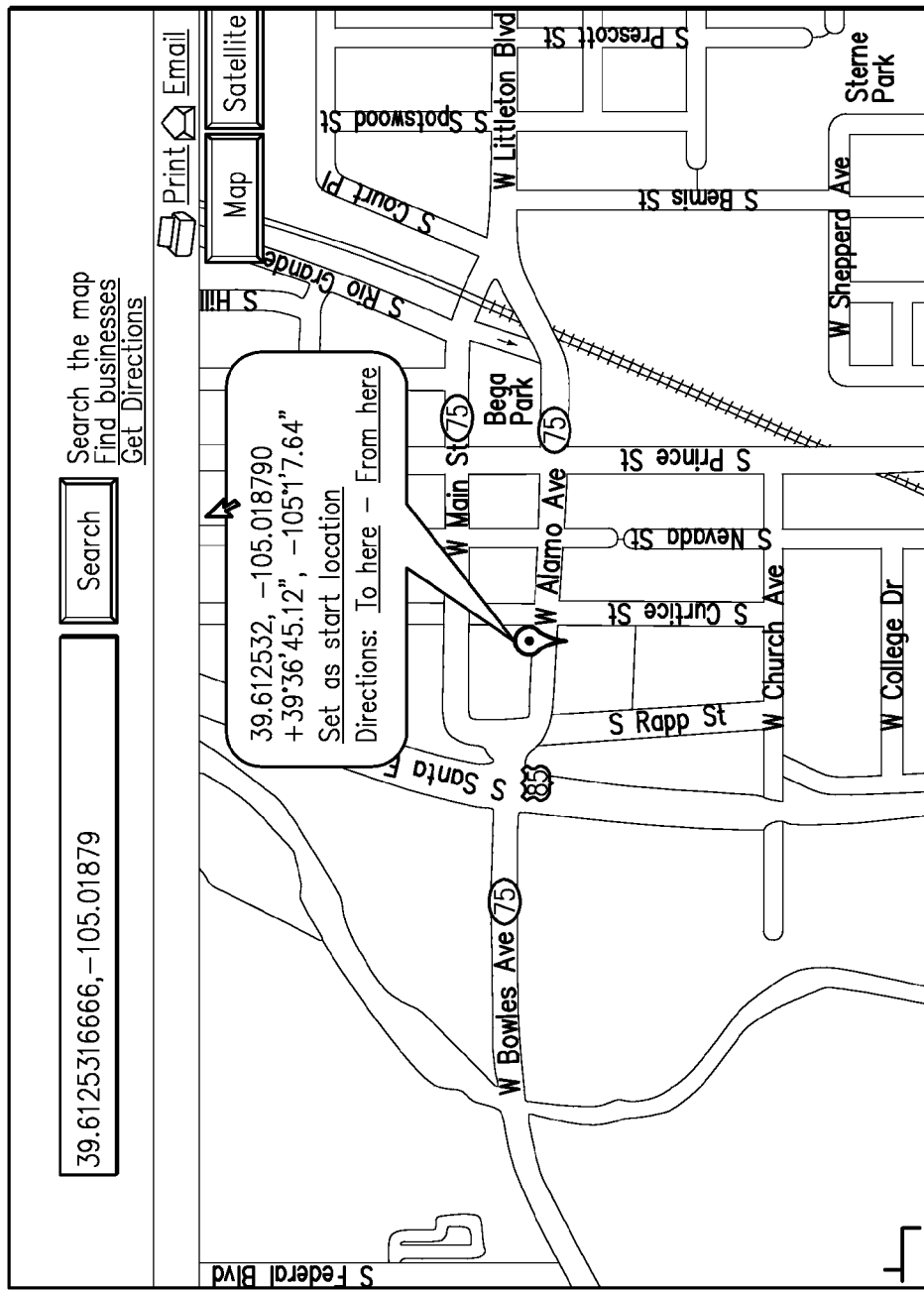
FIG. 6 depicts an example of a user interface screen for displaying a map showing a location of a vehicle, according to one embodiment.
Figure 7:
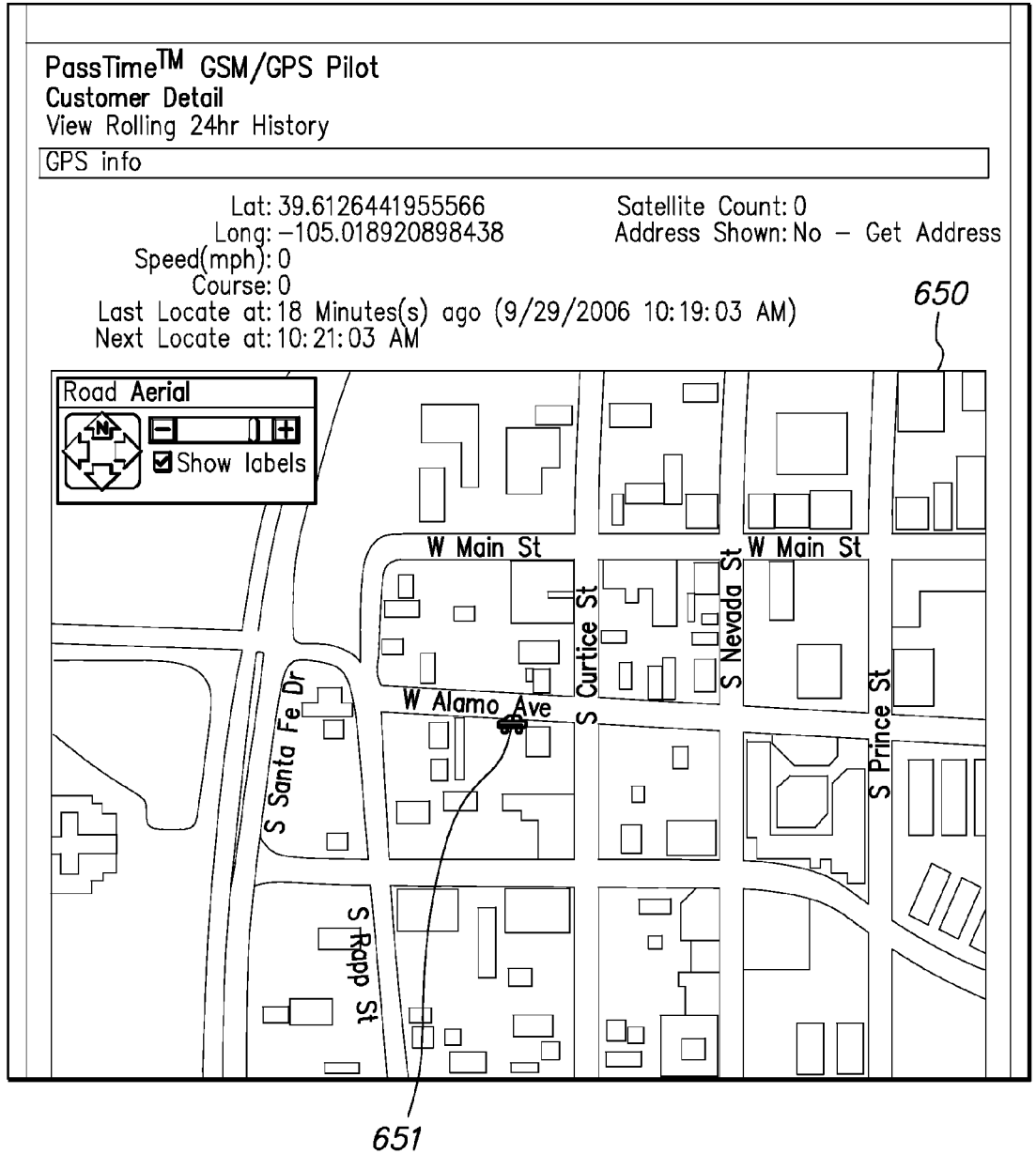
FIG. 7 depicts an example of a user interface screen for displaying a hybrid map/satellite image showing a location of a vehicle, according to one embodiment.

FIG. 4 depicts an example of a user interface screen 400 for viewing GPS information 403, customer information 405, and payment history 409, according to one embodiment. GPS information 403 is presented in latitude and longitude format; clicking on View Map link 404 causes map 600 to be displayed, as shown in FIG. 6 or satellite/map hybrid image 650, as shown in FIG. 7. Clicking on Send Warning link 401 causes software 102 to instruct middleware 106 to send a message 107A to device 111 (via wireless carrier 119), for example to alert owner 110 that payment has not yet been received. Clicking on Send Starter Disable link 402 causes software 102 to instruct middleware 106 to send a message 107A to device 111 (via wireless carrier 119) to disable vehicle 109. Such messages can be initiated from screen 400 as a manual supplement to automatic generation of such messages that is described above.

Figure 10:
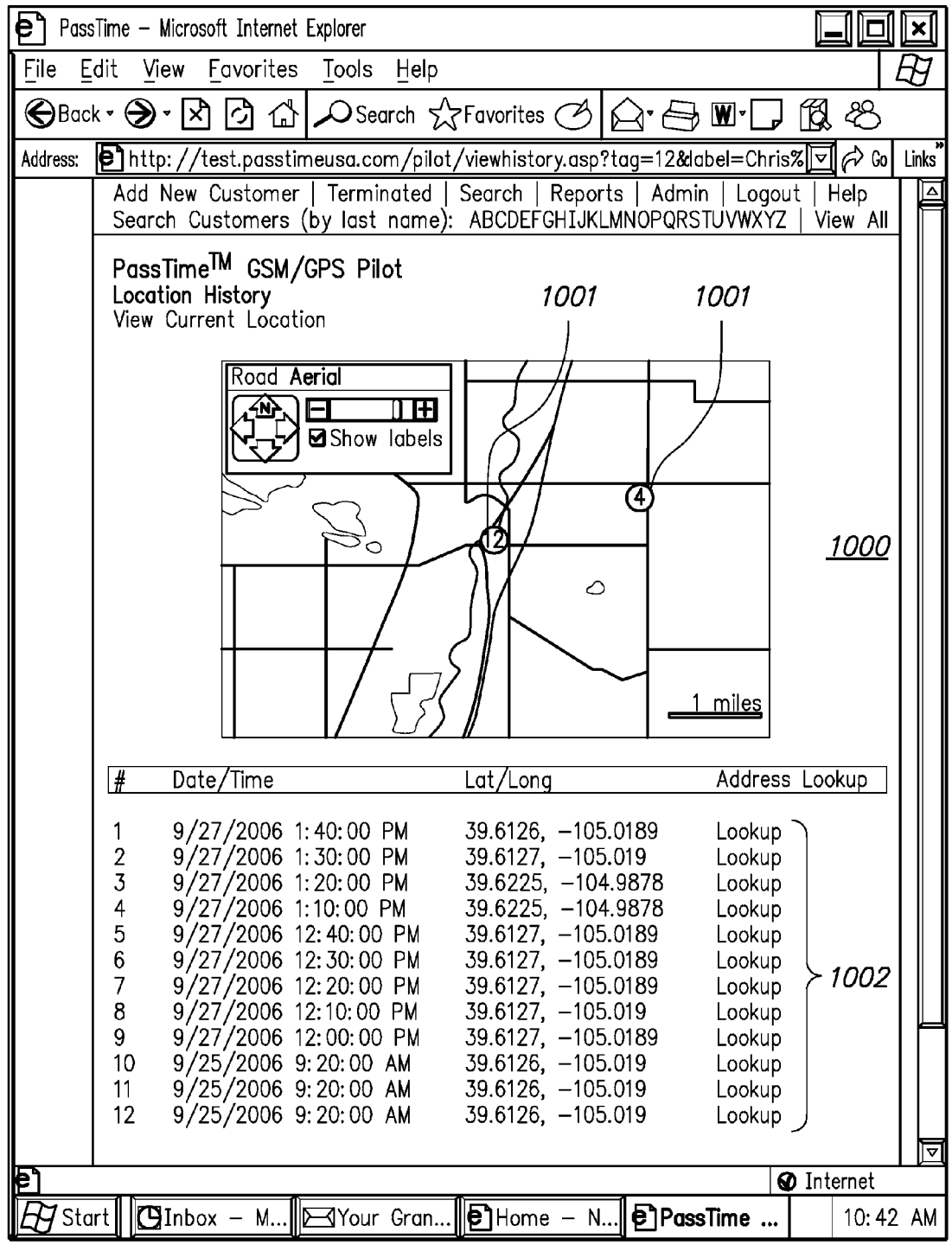
FIG. 10 depicts an example of a user interface screen for showing scheduled interval reporting for a consumer's vehicle.

FIG. 10 is an example of a map 1000 showing scheduled interval reporting, or breadcrumbs. Map 1000 shows historical locations of vehicle 109 over a period of time, for example over the past 24 hours. Numbered indicators 1001 on map 1000 show locations of vehicle 109 over the time period. In one embodiment, table 1002 is keyed to numbered indicators 1001, and shows dates and times corresponding to the indicated locations, as well as latitude and longitude and addresses. In one embodiment, where the time interval between historical locations is small enough, a line can be shown from one numbered indicator 1001 to another, indicating a presumed path of vehicle 109 between the indicated locations.

Payment history 409 includes a list of recently received payments. In one embodiment, system administrator 104 can click on View links 410 in history 409 to see more information about a particular payment, and/or can also click on Print links 411 to print receipts of payments.

Also shown in screen 400 are vehicle information 406, payment schedule information 407, and email contact information 408.

FIG. 5 depicts an example of a user interface screen 500 for specifying warning periods, shutdown periods, payment information, and the like, according to one embodiment. Administrator 104 can enter a number of days until shutdown in field 501 or a shutdown date in field 502. Administrator 104 can enter a number of warning days in field 503 or a warning date in field 503A. Administrator 104 can also enter a number of emergency days in field 504. Payment information can be entered in fields 505, 506, and 507.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct a more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. A method of enforcing a payment schedules for a vehicle purchase, comprising:
   receiving, via an electronic communications network, information regarding payments made by a vehicle purchaser;
   transmitting, via an electronic communications network, a message to a disabling device onboard the vehicle, the message defines a permitted geographic region of operation for the vehicle, and the transmitting responsive to a nonpayment event;
   receiving an indication of violation of the permitted geographic region, the indication created by the device onboard the vehicle; and
   responsive to the GPS information indicating violation of the permitted geographic region of operation, disabling the vehicle.

2. The method of claim 1, further comprising:
   responsive to the indication of violation of the permitted geographic region of operation, transmitting a message, via an electronic communication network, to an external agent.

3. The method of claim 2, wherein the external agent comprises at least one selected from the group consisting of: a repossession agent; a credit issuer; a credit reporting agency; a lender; a roadside assistance provider; and a seller of the product.

4. The method of claim 1, further comprising:
   responsive to the indication of violation of the permitted geographic region of operation, issuing an alert to the vehicle purchaser.

5. The method of claim 1, further comprising:
   on a display device associated with the operations center, displaying vehicle location information.

6. The method of claim 1, wherein:
   the operations center is located remotely with respect to the vehicle.

7. The method of claim 1, wherein disabling the vehicle further comprises disabling the vehicle by the device onboard the vehicle, the disabling in the absence of instructions from an operations center.

8. A system for enforcing a payment schedules for a vehicle purchase, comprising:
   event logic configured to receive information indicating a nonpayment event;
   a wireless transmission interface coupled to the event logic, the wireless transmission interface configured to transmit, responsive to the nonpayment event, a message to a disabling device onboard the vehicle, where the message defines a permitted geographic region of operation for the vehicle;
   a location tracking device configured to determining GPS information specifying vehicle location; and
   a disablement device located onboard the vehicle, the disablement device communicatively coupled to the location tracking device, and the disablement device configured to disable the vehicle responsive to the GPS information indicating violation of the permitted geographic region of operation.

9. The system of claim 8, further comprising:
   a display, coupled to the wireless transmission interface, for displaying vehicle location information.

10. A method of enforcing a permitted geographic region of operation for a vehicle, comprising:
    defining a permitted geographic region of operation for the vehicle;
    transmitting, via an electronic communications network, a representation of the permitted geographic region to an onboard disabling device;
    at the onboard disabling device:
       monitoring vehicle location; and
       disabling the vehicle responsive to violation of the permitted geographic region, and the disabling in the absence of instructions from an operations center.

11. A method of enforcing a permitted geographic region of operation for a vehicle, comprising:
    defining a permitted geographic region of operation for the vehicle;
    transmitting, via an electronic communications network, a representation of the permitted geographic region to an onboard disabling device;
    transmitting, via an electronic communications network, instructions to the onboard disabling device, the instructions specifying action to be taken in the event of a future violation of the permitted geographic region;
    at the onboard disabling device:
       monitoring vehicle location; and
       responsive to violation of the permitted geographic region, performing the specified action.

12. A method of enforcing a permitted geographic region of operation for a vehicle, comprising:
    defining a permitted geographic region of operation for the vehicle;
    transmitting, via an electronic communications network, a representation of the permitted geographic region to an onboard disabling device;
    transmitting, via an electronic communications network, instructions to the onboard disabling device, the instructions specifying action to be taken responsive to violation of the permitted geographic region;

at the onboard disabling device:
  monitoring vehicle location; and
  responsive to violation of the permitted geographic region:
    attempting to contact the operations center via an electronic communications network; and
    responsive to an inability to contact the operations center via an electronic communications network, performing the specified action.

* * * * *

UNITED STATES PATENT AND TRADEMARK OFFICE
CERTIFICATE OF CORRECTION

| | | |
|---|---|---|
| PATENT NO. | : 9,183,530 B2 | Page 1 of 1 |
| APPLICATION NO. | : 11/539292 | |
| DATED | : November 10, 2015 | |
| INVENTOR(S) | : Stanley G. Schwarz et al. | |

It is certified that error appears in the above-identified patent and that said Letters Patent is hereby corrected as shown below:

In the specification,

Column 5, line 29, "a SQL server" should read --an SQL server--;
Column 5, line 57, "acts a protocol" should read --acts as a protocol--;
Column 7, lines 17-18, "may also transmit-ted" should read --may also be transmit-ted--;
Column 7, line 58, "immediately detect 702" should read --immediately detect 703--;
Column 8, line 30, "in its home" should read --in his home--;
Column 11, line 46, "define via" should read --defined via--;
Column 12, line 56, "translate" should read --translates--;
Column 16, line 55, "but is not limited to" should read --but not limited to--.

Signed and Sealed this
Twenty-second Day of March, 2016

Michelle K. Lee
*Director of the United States Patent and Trademark Office*